United States Patent
Peleg et al.

(10) Patent No.: US 8,311,277 B2
(45) Date of Patent: Nov. 13, 2012

(54) METHOD AND SYSTEM FOR VIDEO INDEXING AND VIDEO SYNOPSIS

(75) Inventors: Shmuel Peleg, Mevaseret Zion (IL); Yael Pritch, Jerusalem (IL); Alexander Rav-Acha, Jerusalem (IL); Avital Gutman, Beer Sheva (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 729 days.

(21) Appl. No.: 12/522,843

(22) PCT Filed: Dec. 9, 2007

(86) PCT No.: PCT/IL2007/001520
§ 371 (c)(1),
(2), (4) Date: Jul. 10, 2009

(87) PCT Pub. No.: WO2008/093321
PCT Pub. Date: Aug. 7, 2008

(65) Prior Publication Data
US 2010/0092037 A1    Apr. 15, 2010

Related U.S. Application Data

(60) Provisional application No. 60/898,698, filed on Feb. 1, 2007, provisional application No. 60/911,839, filed on Apr. 13, 2007, provisional application No. 60/971,582, filed on Sep. 12, 2007.

(51) Int. Cl.
*G06K 9/00* (2006.01)
(52) U.S. Cl. .......................... 382/103; 715/723; 725/88
(58) Field of Classification Search ................... None
See application file for complete search history.

(56) References Cited

U.S. PATENT DOCUMENTS 5,767,922 A * 6/1998 Zabih et al. .................. 348/700
(Continued)

FOREIGN PATENT DOCUMENTS

JP    2004-336172    11/2004
(Continued)

OTHER PUBLICATIONS

Office Action issued on Jul. 5, 2011, for JP application No. 2008-539616.

(Continued)

*Primary Examiner* — Bhavesh Mehta
*Assistant Examiner* — Tahmina Ansari
(74) *Attorney, Agent, or Firm* — John R. Thompson; Stoel Rives LLP

(57) ABSTRACT

In a system and method for generating a synopsis video from a source video, at least three different source objects are selected according to one or more defined constraints, each source object being a connected subset of image points from at least three different frames of the source video. One or more synopsis objects are sampled from each selected source object by temporal sampling using image points derived from specified time periods. For each synopsis object a respective time for starting its display in the synopsis video is determined, and for each synopsis object and each frame a respective color transformation for displaying the synopsis object may be determined. The synopsis video is displayed by displaying selected synopsis objects at their respective time and color transformation, such that in the synopsis video at least three points that each derive from different respective times in the source video are displayed simultaneously.

37 Claims, 7 Drawing Sheets

U.S. PATENT DOCUMENTS

| | | | |
|---|---|---|---|
| 5,850,352 A * | 12/1998 | Moezzi et al. | 345/419 |
| 6,514,081 B1 * | 2/2003 | Mengoli | 434/252 |
| 7,127,127 B2 | 10/2006 | Jojic et al. | |
| 7,184,100 B1 * | 2/2007 | Wilf et al. | 348/700 |
| 7,296,231 B2 * | 11/2007 | Loui et al. | 715/723 |
| 7,720,349 B2 * | 5/2010 | Ogikubo | 386/278 |
| 7,733,379 B2 * | 6/2010 | Hosoda | 348/222.1 |
| 2002/0163582 A1 * | 11/2002 | Gruber et al. | 348/218.1 |
| 2004/0260575 A1 * | 12/2004 | Massey, Jr. | 705/1 |
| 2006/0117356 A1 * | 6/2006 | Jojic et al. | 725/88 |
| 2006/0247070 A1 * | 11/2006 | Funk et al. | 473/222 |
| 2010/0092037 A1 * | 4/2010 | Peleg et al. | 382/103 |
| 2010/0125581 A1 * | 5/2010 | Peleg et al. | 707/737 |

FOREIGN PATENT DOCUMENTS

| | | |
|---|---|---|
| JP | 2005210573 | 8/2005 |
| WO | WO 01/78050 | 10/2001 |
| WO | 2004040480 | 5/2004 |
| WO | WO 2006/048875 | 5/2006 |
| WO | WO 2007/057893 | 5/2007 |
| WO | WO 2008/093321 | 8/2008 |

OTHER PUBLICATIONS

International Search Report issued Apr. 24, 2008 in International Application No. PCT/IL2007/001520.

Agarwala, et al, *Panoramic Video Textures*, ACM SIGGRAPH 2005 Conference Proceedings.

Irani, et al, *Efficient Representations of Video Sequences and Their Applications*, Signal Processing: Image Communication, 8(4):327-351, 1996.

Pal, et al, *Interactive Montages of Sprites for Indexing and Summarizing Security Video*, In Video Proceedings of CVPRO5, p. II: 1192, 2005.

Rav-Acha, et al, *Dynamosaics: Video Mosaics with Non-Chronological Time*, Proceedings of the 2005 IEEE Computer Society Conference on Computer Vision and Pattern Recognition (CVPR'05) 1063-6919/05.

Chinese Office Action dated May 11, 2012 issued for the corresponding patent application No. 200780050610.0, and translation thereof.

* cited by examiner

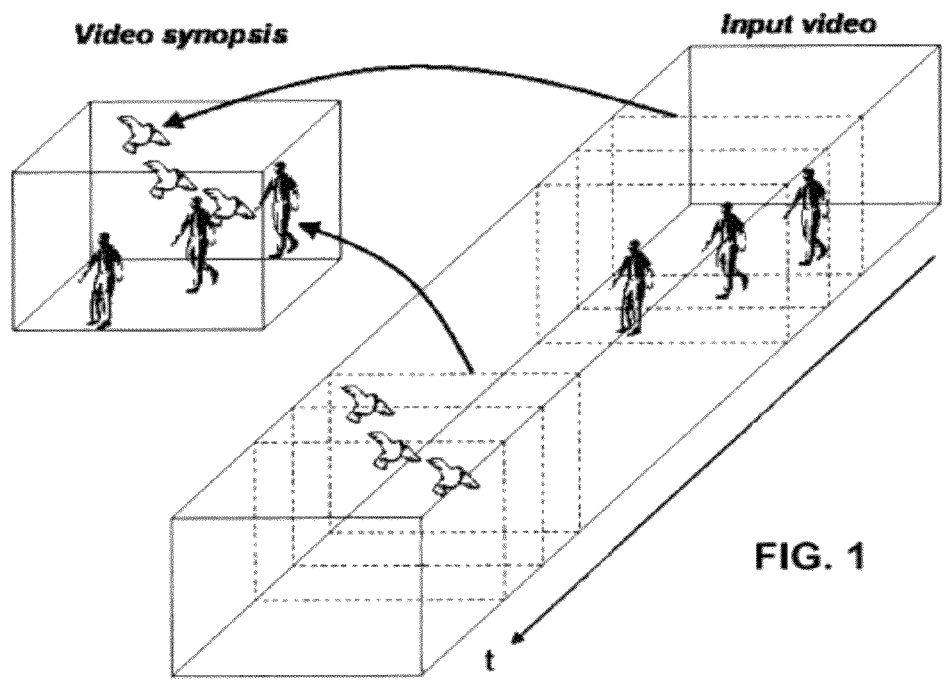
FIG. 1
FIG. 2a FIG. 2b
FIG. 2c FIG. 2d

FIG. 3a
FIG. 3b
FIG. 3c
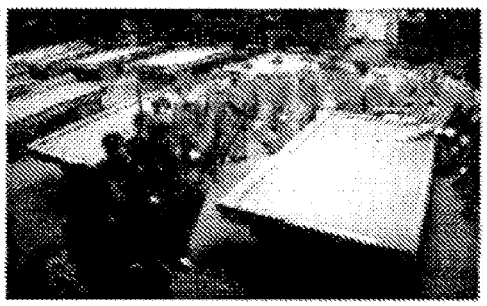
FIG. 3d
FIG. 4a
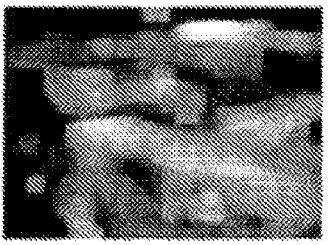
FIG. 4b
FIG. 5a   FIG. 5b

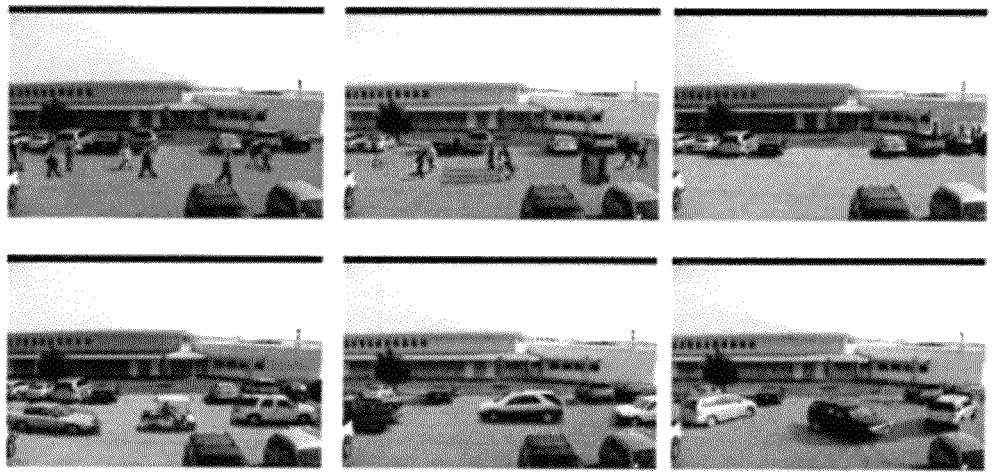
FIG. 8
FIG. 9
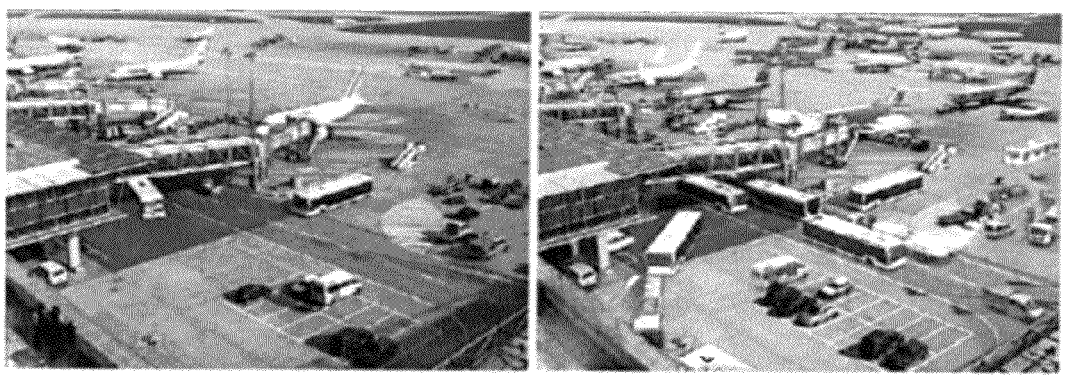
FIG. 10a          FIG. 10b

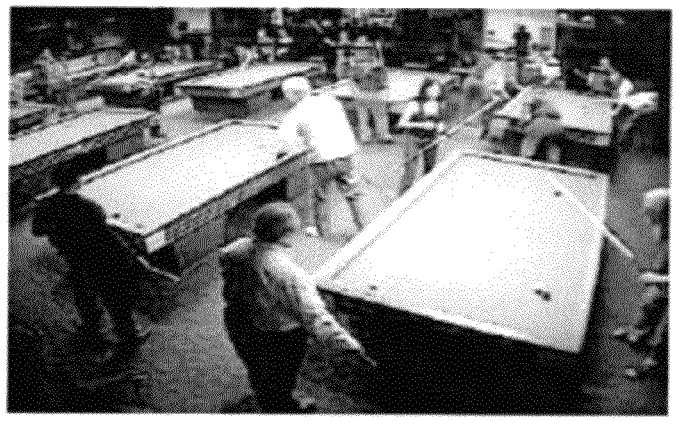
FIG. 11
 
FIG. 12a  FIG. 12b
 
FIG. 13a  FIG. 13b

METHOD AND SYSTEM FOR VIDEO INDEXING AND VIDEO SYNOPSIS

RELATED APPLICATIONS

This application is a national stage entry in compliance with 35 U.S.C. 371 of international application PCT/IL07/01520, filed Dec. 9, 2007, and further claims benefit of provisional application Ser. Nos. 60/898,698 filed Fe. 1, 2007; 60/911,839 filed Apr. 13, 2007 and 60/971,582 filed Sep. 12, 2007 all whose contents are included herein by reference.

FIELD OF THE INVENTION

This invention relates to the field of video summarization and video indexing.

PRIOR ART

Prior art references considered to be relevant as a background to the invention are listed below and their contents are incorporated herein by reference. Additional references are mentioned in the above-mentioned U.S. provisional application Nos. 60/898,698; 60/911,839 and 60/971,582 and their contents are incorporated herein by reference. Acknowledgement of the references herein is not to be inferred as meaning that these are in any way relevant to the patentability of the invention disclosed herein. Each reference is identified by a number enclosed in square brackets and accordingly the prior art will be referred to throughout the specification by numbers enclosed in square brackets.

[1] A. Agarwala, M. Dontcheva, M. Agrawala, S. Drucker, A. Colburn, B. Curless, D. Salesin, and M. Cohen. *Interactive digital photomontage*. In SIGGRAPH, pages 294-302, 2004.

[2] Y. Boykov and V. Kolmogorov. *An experimental comparison of min-cut/max-flow algorithms for energy minimization in vision*. IEEE Trans. on Pattern Analysis and Machine Intelligence, 26(9):1124-1137, September 2004.

[3] S. Cohen. *Background estimation as a labeling problem*. In ICCV'05, pages 1034-1041, Washington, D.C., 2005.

[4] A. Divakaran, K. Peker, R. Radhakrishnan, Z. Xiong, and R. Cabasson. *Video summarization using mpeg-7 motion activity and audio descriptors*. Technical Report TR-2003-34, MERL—A Mitsubishi Electric Research Laboratory, Cambridge, Mass., May 2003.

[5] G. Doretto, A. Chiuso, Y. Wu, and S. Soatto. Dynamic textures. Int. J. Computer Vision, 51:91-109, 2003.

[6] M. Irani, P. Anandan, J. Bergen, R. Kumar, and S. Hsu. *Efficient representations of video sequences and their applications*. Signal Processing: Image Communication, 8(4):327-351, 1996.

[7] H. Kang, Y. Matsushita, X. Tang, and X. Chen. *Space-time video montage*. In CVPR'06, pages 1331-1338, New-York, June 2006.

[8] C. Kim and J. Hwang. *An integrated scheme for object-based video abstraction*. In ACM Multimedia, pages 303-311, New York, 2000.

[9] S. Kirkpatrick, C. D. Gelatt, and M. P. Vecchi. *Optimization by simulated annealing*. Science, 4598(13):671-680, 1983.

[10] V. Kolmogorov and R. Zabih. *What energy functions can be minimized via graph cuts?* In ECCV, pages 65-81, 2002.

[11] Y. Li, T. Zhang, and D. Tretter. *An overview of video abstraction techniques*. Technical Report HPL-2001-191, HP Laboratory, 2001.

[12] J. Nam and A. Tewfik. *Video abstract of video*. In 3rd IEEE Workshop on Multimedia Signal Processing, pages 117-122, Copenhagen, September 1999.

[13] J. Oh, Q. Wen, J. lee, and S. Hwang. *Video abstraction*. In S. Deb, editor, Video Data Mangement and Information Retrieval, pages 321-346. Idea Group Inc. and IRM Press, 2004.

[14] M. Oren, C. Papageorgiou, P. Shinha, E. Osuna, and T. Poggio. *A trainable system for people detection*. In Proceedings of Image Understanding Workshop, pages 207-214, 1997.

[15] M. Gangnet P. Perez and A. Blake. *Poisson image editing*. In SIGGRAPH, pages 313-318, July 2003.

[16] C. Pal and N. Jojic. *Interactive montages of sprites for indexing and summarizing security video*. In Video Proceedings of CVPR05, page II: 1192, 2005.

[17] R. Patil, P. Rybski, T. Kanade, and M. Veloso. *People detection and tracking in high resolution panoramic video mosaic*. In Int. Conf. on Intelligent Robots and Systems (IROS 2004), volume 1, pages 1323-1328, October 2004.

[18] N. Petrovic, N. Jojic, and T. Huang. *Adaptive video fast forward*. Multimedia Tools and Applications, 26(3):327-344, August 2005.

[19] A. Pope, R. Kumar, H. Sawhney, and C. Wan. Video abstraction: *Summarizing video content for retrieval and visualization*. In Signals, Systems and Computers, pages 915-919, 1998.

[20] A. Rav-Acha, Y. Pritch, and S. Peleg. *Making a long video short: Dynamic video synopsis*. In CVPR'06, pages 435-441, New-York, June 2006.

[21] A. M. Smith and T. Kanade. *Video skimming and characterization through the combination of image and language understanding*. In CAIVD, pages 61-70, 1998.

[22] J. Sun, W. Zhang, X. Tang, and H. Shum. *Background cut*. In ECCV, pages 628-641, 2006.

[23] Y. Weiss and W. T. Freeman. *On the optimality of solutions of the max-product belief propagation algorithm in arbitrary graphs*. IEEE Transactions on Information Theory, 47(2):723-735, 2001.

[24] X. Zhu, X. Wu, J. Fan, A. K. Elmagarmid, and W. G. Aref. *Exploring video content structure for hierarchical summarization*. Multimedia Syst., 10(2):98-115, 2004.

[25] S. Peleg and A. Rav-Acha, WO2007/057893 *"Method and system for producing a video synopsis"*

[26] J. Assa, Y. Caspi, and D. Cohen-Or. Action synopsis: *Pose selection and illustration*. In SIGGRAPH, pages 667-676, 2005.

[27] Carsten Rother, Lucas Bordeaux, Youssef Hamadi, and Andrew Blake. *Autocollage*. ACM Transactions on Graphics, 25(3):847-852, July 2006.

[28] Aseem Agarwala. *Efficient gradient-domain compositing using quadtrees*. ACM Transactions on Graphics (Proceedings of SIGGRAPH 2007), 2007.

[29] G. Brostow and I. Essa. *Motion based decompositing of video*. In ICCV'99, pages 8-13, Corfu, 1999.

[30] J. Shi and J. Malik, *Normalized cuts and image segmentation*, IEEE Transactions on Pattern Analysis and Machine Intelligence, 22(8):888-905, 2000.

[31] O. Boiman and M. Irani. *Detecting irregularities in images and in video*. In ICCV, pages I: 462-469, Beijing, 2005.

[32] B. M. Carvalho, G. T. Herman, and T. Y. Kong. *Simultaneous fuzzy segmentation of multiple objects*. Discrete Applied Mathematics, Vol 151, No. 1-3, October 2005, pp 55-77.

[33] G. T. Herman and B. M. Carvalho. *Multiseeded Segmentation Using Fuzzy Connectedness*. IEEE Transactions on Pattern Analysis and Machine Intelligence, v. 23 no. 5, pp. 460-474, May 2001.

[34] A. Levin, A. Rav-Acha, and D. Lischinski. *Spectral Matting*. IEEE Conf. on Computer Vision and Pattern Recognition (CVPR), Minneapolis, June 2007.

[35] N. E. Apostoloff and A. W. Fitzgibbon. *Bayesian video matting using learnt image priors*. In Proceedings IEEE Computer Society Conference on Computer Vision and Pattern Recognition (CVPR), June 2004, Washington D.C.

BACKGROUND OF THE INVENTION

Sorting through a collection of raw video is time consuming since it is necessary to view a video clip in order to determine if anything of interest has been recorded. While this tedious task may be feasible in personal video collections, it is impossible when endless video, as recorded by surveillance cameras and webcams, is involved. Millions of webcams are covering the world capturing their field of view 24 hours a day. It is reported that in UK alone there are millions of surveillance cameras covering the city streets. Many webcams even transmit their video publicly over the internet for everyone to watch. Many security cameras are also available online in stores, airports and other public areas.

One of the problems in utilizing webcams is that they provide raw, unedited, data. Most surveillance video is therefore never watched or examined. In our earlier WO2007/057893 [25] we proposed a method for video synopsis for creating shortened videos by combining selected portions from multiple original images of a scene. A video clip describes visual activities along time, and compressing the time axis allows viewing a summary of such a clip in a shorter time. Fast-forward, where several frames are skipped between selected frames, is the most common tool used for video summarization. A special case of fast-forward is called "time lapse", generating a video of very slow processes like growth of flowers, etc. Since fast-forward may lose fast activities during the dropped frames, methods for adaptive fast forward have been developed [12, 18, 4]. Such methods attempt to skip frames in periods of low interest or lower activity, and keep frames in periods of higher interest or higher activity. A similar approach extracts from the video a collection of short video sequences best representing its contents [21].

Many approaches to video summary eliminate completely the time axis, and show a synopsis of the video by selecting a few key frames [8, 24]. These key frames can be selected arbitrarily, or selected according to some importance criteria. But key frame representation loses the dynamic aspect of video. Comprehensive surveys on video abstraction appear in [11, 13].

In both approaches above, entire frames are used as the fundamental building blocks. A different methodology uses mosaic images together with some meta-data for video indexing [6, 19, 16]. In this case the static synopsis image includes objects from different times.

Object-based approaches to video synopsis were first presented in [20, 7], where moving objects are represented in the space-time domain. The concatenation of portions of images representing objects or activities across successive frames of a video are called "tubes". As objects are represented by tubes in the space-time volume, the terms "objects" and "tubes" are used interchangeably in the following description. These papers [20, 7] introduced a new concept: creating a synopsis video that combines activities from different times (see FIG. 1).

An example of an object-based approach is disclosed in WO2007/057893 [25] assigned to the present applicant wherein a subset of frames in an input video is obtained that show movement of one or more objects. Selected portions from the subset that show non-spatially overlapping appearances of the objects in the first dynamic scene are copied from multiple input frames to a reduced number of frames in the output video sequence such that multiple locations of the objects as seen at different times in the input video are shown simultaneously in the output video.

The approaches disclosed in references [20, 7] are based on the observation that more activities can be shown in shorter video if the chronological order is not enforced. It would be useful to extend such an approach to the synopsis of endless video sequences such as obtained using surveillance cameras so as to limit the duration of the output video to a desired limit while nevertheless doing so in a controlled manner that reduces the risk of feature loss.

Efficient indexing, retrieval and browsing of long video is growing in importance, especially given the rapid increase in the number of surveillance cameras that endlessly collect video. Conventional video indexing uses manual annotation of the video with keywords, but this method is time-consuming and impractical for surveillance cameras. Additional video indexing methods have been proposed, based on selection of representative key frames or representative time intervals from the input video.

Video synopsis can be used for indexing, retrieval and browsing as many objects in a covered time period are shown in a short synopsis video. However, since many different objects are shown simultaneously, examining the simple synopsis video may be confusing.

US20060117356 (Microsoft) discloses a video browser that provides interactive browsing of unique events occurring within an overall video recording. In particular, the video browser processes the video to generate a set of video sprites representing unique events occurring within the overall period of the video. These unique events include, for example, motion events, security events, or other predefined event types, occurring within all or part of the total period covered by the video. Once the video has been processed to identify the sprites, the sprites are then arranged over a background image extracted from the video to create an interactive static video montage. The interactive video montage illustrates all events occurring within the video in a single static frame. User selection of sprites within the montage causes either playback of a portion of the video in which the selected sprites were identified, or concurrent playback of the selected sprites within a dynamic video montage.

WO0178050 (Inmotion Technologies Ltd.) discloses a system and method for using standard video footage even from a single video camera to obtain, in an automated fashion, a stroboscope sequence of a sports event, for example. The sequence may be represented as a static images of a photographic nature, or by a video sequence in which camera motion remains present, in which case the video sequence can be rendered as a panning camera movement on a stroboscope picture or as an animated stroboscope sequence in which the moving object leaves a trailing trace of copies along its path. Multiple cameras can be used for an expanded field of view or for comparison of multiple sequences, for example.

JP-2004-336172 discloses a system for shortening a surveillance video, which maintains chronological order of events, without separating between concurrently moving objects, Maintaining chronological order substantially limits the shortening possibilities. Also there is no suggestion to index objects so that the original time of an object in the synopsis video can be easily determined.

SUMMARY OF THE INVENTION

According to a first aspect of the invention there is provided a computer-implemented method for a computer-implemented method for generating a synopsis video from a substantially endless source video stream as generated by a video surveillance camera, the method comprising:

receiving in real time object-based descriptions of at least three different source objects in said source video stream, each source object being a connected subset of image points from at least three different frames of the source video stream;

continuously maintaining a queue of said received object-based descriptions including for each respective source object its duration and location;

selecting a subset of at least three source objects from said queue based on given criteria, sampling from each selected source object one or more synopsis objects by temporal sampling;

determining for each synopsis object a respective display time for starting its display in the synopsis video; and generating the synopsis video by displaying selected synopsis objects or objects derived therefrom each at its respective predetermined display time;

such that at least three points, each derived from different respective times in the source video stream, are displayed simultaneously in the synopsis video and at least two points, both derived from the same time, are displayed at different times in the synopsis video.

According to a second aspect of the invention there is provided a system for generating a synopsis video from a substantially endless source video stream as generated by a video surveillance camera, the system comprising:

a source object selector adapted to be coupled to an object memory that stores a continuously maintained queue of object-based descriptions of at least three different source objects in said source video stream, said object-based descriptions including for each respective source object its duration and location, the source object selector being adapted to select at least three different source objects according to one or more defined constraints, each source object being a connected subset of image points from at least three different frames of the source video stream;

a synopsis object sampler coupled to the source object selector for sampling from each selected source object one or more synopsis objects by temporal sampling using image points derived from specified time periods;

a time selection unit coupled to the synopsis object sampler for determining for each synopsis object a respective display time for starting its display in the synopsis video;

a stitching unit coupled to the time selection unit for stitching each of the selected synopsis objects or objects derived therefrom at a respective display time so as to generate successive synopsis video frames, such that in the synopsis video frames at least three points that each derive from different respective times in the source video stream are displayed simultaneously; and a synopsis frame memory coupled to the stitching unit for storing said synopsis video frames.

The video synopsis disclosed by the present invention is a temporally compact representation of the video that enables video browsing and retrieval and allows indexing of different features so as to allow selected features to be isolated and for their temporal progression in a specified time interval to be displayed. In accordance with some embodiments of the invention, a hierarchical video indexing based on video synopsis is employed wherein indexing is based of first selecting the class of desired objects or activities, and only later selecting an individual object or activity. This procedure may be repeated so as to allow multi-level hierarchical indexing.

An example of the general type of video synopsis with which the invention is concerned is described in [25] with reference to the space-time volume shown in FIG. 1. The video begins with a person walking on the ground, and after a period of inactivity a bird is flying in the sky. The inactive frames are omitted in most video abstraction methods. Video synopsis is substantially more compact, playing the person and the bird simultaneously. This makes an optimal use of image regions by shifting events from their original time intervals to other time intervals when no other activities take place at these spatial locations. Such manipulations relax the chronological consistency of events. To the extent that similar techniques may be employed by the present invention, they will not be repeated here and the reader should refer to WO2007/057893 for a full description. For the sake of brevity and in order not to obfuscate the present invention, which in some aspects may be seen as an improvement of WO2007/057893, only those features that relate to the present invention will be described in detail.

Applying this principle to infinite video as obtain by webcams and surveillance cameras involves many additional challenges:

Since no storage is infinite, there is a need to "forget" events when an infinite video is summarized.

The appearance of the background varies substantially in a long video, e.g. day to night. These changes should be addressed when creating the background of the synopsis and when inserting objects into the background.

Because activities from different times can appear simultaneously and on a background from even another time, special care should be taken when stitching all these to give the output video.

Fast response to user queries is required in spite of the huge amount of data.

Video synopsis can make surveillance cameras and webcams more useful by giving the viewer the ability to view summaries of the endless video, in addition to the live video stream. To enable this, a synopsis server can view the live video feed, analyze the video for interesting events, and record an object-based description of the video. This description lists for each webcam the interesting objects, their duration, location, and their appearance.

A query that could be answered by the system may be similar to "I would like to watch in one minute a synopsis of the video from this webcam captured during the last hour", or "I would like to watch in five minutes a synopsis of last week", etc. Responding to such a query, the most interesting events ("tubes") are collected from the desired period, and are assembled into a synopsis video of the desired length. The synopsis video is an index into the original video as each object includes a pointer to its original time.

While webcam video is endless, and the number of objects is unbounded, the available data storage for each webcam may be limited. To keep a finite object queue we propose a procedure for removing objects from this queue when space is exhausted. Removing objects from the queue should be done according to similar importance criteria as done when selecting objects for inclusion in the synopsis, allowing the final optimization to examine fewer objects.

Within the context of the invention and the appended claims, the term "video" is synonymous with "movie" in its most general term providing only that it is accessible as a computer image file amenable to post-processing and includes any kind of movie file e.g. digital, analog. The camera is preferably at a fixed location by which is meant that it can rotate and zoom—but is not subjected to translation motion as is done in hitherto-proposed techniques. The scenes with the present invention is concerned are dynamic at least some of the time.

In order to describe the invention use will be made of a construct that we refer to as the "space-time volume" to create the synopsis videos. The space-time volume may be constructed from the input sequence of images by sequentially stacking all the frames along the time axis. However, it is to be understood that so far as actual implementation is concerned, it is not necessary actually to construct the space-time volume for example by actually stacking in time 2D frames of a dynamic source scene. More typically, source frames are processed individually to construct target frames but it will aid understanding to refer to the space time volume as though it is a physical construct rather than a conceptual construct.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 1 is a pictorial representation showing a prior art approach for producing a compact video synopsis by playing temporally displaced features simultaneously;

FIGS. 2a to 2d show background images from a surveillance camera at Stuttgart airport at different times;

FIGS. 3a to 3d show four extracted tubes shown "flattened" over the corresponding backgrounds from FIGS. 2a to 2d;

FIGS. 4a and 4b show two extracted tubes from a "Billiard" scene;

FIGS. 5a and 5b show spatial distribution of activity in the airport scene shown in FIG. 2;

FIG. 8 shows the result of clustering objects appearing in the surveillance video of the parking lot shown in FIG. 12;

FIG. 9 shows a frame from a "top-level synopsis" in the indexing hierarchy of the parking lot video shown in FIG. 13 where representatives of the different clusters are presented simultaneously;

FIGS. 10a and 10b show synopsis frames from a video captured over 24 hours at Stuttgart airport;

FIG. 11 shows a synopsis frame generated from three frames taken from a video captured over 9 hours in a billiard club;

FIGS. 12a and 12b show synopsis frames generated from a video captured overnight in St. Petersburg;

FIGS. 13a and 13b show synopsis frames generated from a webcam taken over five hours of a quiet parking lot;

Figure 6:
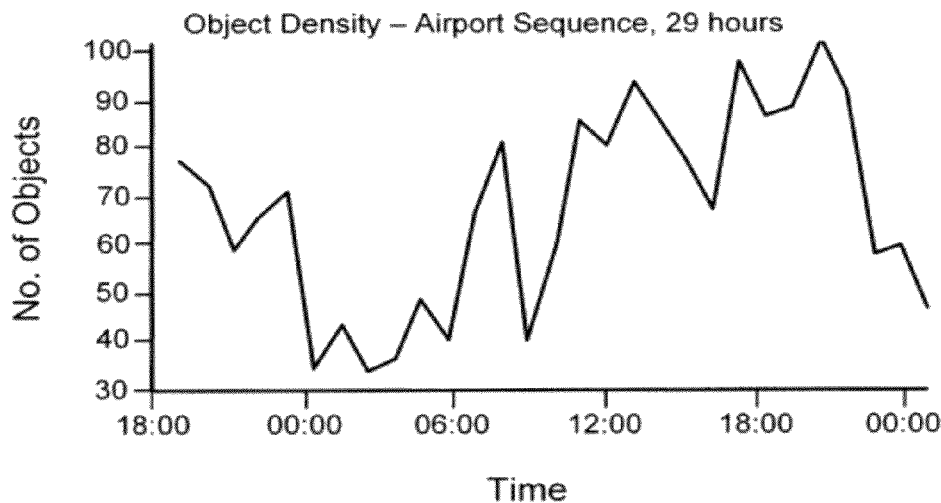
FIG. 6 shows graphically temporal distribution of activities in the airport scene shown in FIG. 2, as measured by number of moving objects.

Examples of video synopsis as shown as representative frames in the figures are, of course, best viewed in video. Examples can be accessed at http://www.vision.huji.ac.il/video-synopsis/.

DETAILED DESCRIPTION OF EMBODIMENTS

Computing Activity Tubes

From each object, segments are created by selecting subsets of frames in which the object appears. Such segments can represent different time intervals, optionally taken at different sampling rates.

In order to apply such a technique to generate a useful synopsis of endless video, interesting objects and activities (tubes) should be identified. In many cases the indication of interest is simple: a moving object is interesting. While we use object motion as an indication of interest in many examples, exceptions must be noted. Some motions may have little importance, like leaves on a tree or clouds in the sky. People or other large animals in the scene may be important even when they are not moving. While we do not address these exceptions, it is possible to incorporate object recognition (e.g. people detection [14, 17]), dynamic textures [5], or detection of unusual activities [31]. We will give a simple example of video synopsis giving preferences to different classes of objects.

Background Construction

To enable segmentation of moving foreground objects we start with background construction. In short video clips the appearance of the background does not change, and it can be built by using a temporal median over the entire clip. In the case of surveillance cameras, the appearance of the background changes in time due to changes in lighting, changes of background objects, etc. In this case the background for each time can be computed using a temporal median over a few minutes before and after each frame. We normally use a median over four minutes. Other methods for background construction are possible, even when using a shorter temporal window [3, 9], but we used the median due to its efficiency.

FIGS. 2a to 2d show background images from a surveillance camera at Stuttgart airport. FIGS. 2a and 2b show daylight images while FIGS. 2c and 2d are at night. Parked cars and parked airplanes become part of the background.

We used a simplification of [22] to compute the space-time tubes representing dynamic objects. This is done by combining background subtraction together with min-cut to get a smooth segmentation of foreground objects. As in [22], image gradients that coincide with background gradients are attenuated, as they are less likely to be related to motion boundaries. The resulting "tubes" are connected components in the 3D space-time volume, and their generation is briefly described below.

Let B be the current background image and let I be the current image to be processed. Let V be the set of all pixels in I, and let N be the set of all adjacent pixel pairs in I. A labeling function $f$ labels each pixel r in the image as foreground ($f_r=1$) or background ($f_r=0$). A desirable labeling $f$ usually minimizes the Gibbs energy [2]:

$$E(f) = \sum_{r \in V} E_1(f_r) + \lambda \sum_{(r,s) \in N} E_2(f_r, f_s), \quad (1)$$

where $E_1(f_r)$ is the unary-color term, $E_2(f_r,f_s)$ is the pairwise-contrast term between adjacent pixels r and s, and $\lambda$ is a user defined weight.

As a pairwise-contrast term, we used the formula suggested by [22]:

$$E_2(f_r,f_s)=\delta(f_r-f_s)\cdot\exp(-\beta d_{rs}), \quad (2)$$

where $\beta=2<\|I(r)-I(s)\|^2>^{-1}$ is a weighting factor ($<\cdot>$ is the expectation over the image samples), and $d_{rs}$ are the image gradients, attenuated by the background gradients, and given by:

$$d_{rs} = \|I(r)-I(s)\|^2 \cdot \frac{1}{1+\left(\frac{\|B(r)-B(s)\|}{K}\right)^2 \exp\left(\frac{-z_{rs}^2}{\sigma_z}\right)} \quad (3)$$

In this equation, $z_{rs}$ measures the dissimilarity between the foreground and the background:

$$z_{rs}=\max\|I(r)-B(r)\|,\|I(s)-B(s)\|, \quad (4)$$

and K and $\sigma_z$ are parameters, set to 5 and 10 respectively as suggested by [22].

As for the unary-color term, let $d_r=\|I(r)-B(r)\|$ be the color differences between the image I and the current background B. The foreground (1) and background (0) costs for a pixel r are set to:

$$E_1(1) = \begin{cases} 0 & d_r > k_1 \\ k_1 - d_r & \text{otherwise,} \end{cases} \quad (5)$$

$$E_1(0) = \begin{cases} \infty & d_r > k_2 \\ d_r - k_1 & k_2 > d_r > k_1 \\ 0 & \text{otherwise,} \end{cases}$$

where $k_1$ and $k_2$ are user defined thresholds. Empirically $k_1=30/255$ and $k_2=60/255$ worked well in our examples.

We do not use a lower threshold with infinite weights, since the later stages of our algorithm can robustly handle pixels that are wrongly identified as foreground. For the same reason, we construct a mask of all foreground pixels in the space-time volume, and apply a 3D morphological dilation on this mask. As a result, each object is surrounded by several pixels from the background. This fact will be used later by the stitching algorithm.

Finally, the 3D mask is grouped into connected components, denoted as "activity tubes". FIGS. 3a to 3d show four extracted tubes shown "flattened" over the corresponding backgrounds from FIG. 2. The left tubes correspond to ground vehicles, while the right tubes correspond to airplanes on the runway at the back. FIGS. 4a and 4b show synopsis frames derived using two extracted tubes from a "Billiard" scene so as to depict in a single frame a multitude of temporally separated players.

Each tube b is represented by its characteristic function $$\chi_b(x,y,t) = \begin{cases} \|I(x,y,t)-B(x,y,t)\| & t \in t_b \\ 0 & \text{otherwise,} \end{cases} \quad (6)$$

where $B(x,y,t)$ is a pixel in the background image, $I(x,y,t)$ is the respective pixel in the input image, and $t_b$ is the time interval in which this object exists.

Other methods for segmentation of moving objects are possible. For example, in binary segmentation, every element in the image can be classified as belonging to an object or not belonging to an object. Segmentation can also be fuzzy, assigning to each element in an image a grade of membership in an object. Suitable approaches are described in [32, 33, 34, 35]. The notion of fuzzy connectivity is explained in [33]. Fuzzy segmentation is sometimes called Fuzzy matting [35], and is extensively used in graphics for insertion of objects of different backgrounds [35]. In our work we treat all objects as binary. However, an extension to fuzzy objects is straightforward. For example, all elements of the cost functions can be multiplied by the fuzzy membership values of the involved elements. Also, when a fuzzy object is inserted into an image, the membership value can be used "alpha matting", allowing a transparency effect.

Energy Between Tubes

We now define the energy of interaction between tubes. This energy will later be used by the optimization stage, creating a synopsis having maximum activity while avoiding conflicts and overlap between objects. Let B be the set of all activity tubes. Each tube b is defined over a finite time segment in the original video stream $t_b=[t_b^s,t_b^e]$.

The synopsis video is generated based on a temporal mapping M, shifting objects b in time from its original time in the input video into the time segment $\hat{t}_b=[\hat{t}_b^s,\hat{t}_b^e]$ in the video synopsis. $M(b)=\hat{b}$ indicates the time shift of tube b into the synopsis, and when b is not mapped to the output synopsis $M(b)=\emptyset$. We define an optimal synopsis video as the one that minimizes the following energy function:

$$E(M) = \sum_{b \in B} E_a(\hat{b}) + \sum_{b,b' \in B} \left(\alpha E_t(\hat{b},\hat{b}') + \beta E_c(\hat{b},\hat{b}')\right), \quad (7)$$

where $E_a$ is the activity cost, $E_t$ is the temporal consistency cost, and $E_c$ is the collision cost, all defined below. Weights $\alpha$ and $\beta$ are set by the user according to their relative importance for a particular query. Reducing the weights of the collision cost, for example, will result in a denser video where objects may overlap. Increasing this weight will result in sparser video where objects do not overlap and less activity is presented. An example for the different synopsis obtained by varying $\beta$ is given in FIG. 10b.

After extracting the activity tubes the pixel based cost can be replaced with object based cost. Specifically, the Stitching cost associated with prior art approaches such as discussed in [25] is replaced by the Collision cost in Eq. (7) (described below). This cost penalizes for stitching two different objects together, even if their appearance is similar (e.g. two people). In addition, a "Temporal Consistency" cost is defined, penalizing for the violation of the temporal relations between objects (or tubes). Such features of the synopsis are harder to express in terms of pixel-based costs.

Activity Cost

The activity cost favors synopsis movies with maximum activity. It penalizes for objects that are not mapped to a valid time in the synopsis. When a tube is excluded from the synopsis, i.e $M(b)=\emptyset$, then $$E_a(\hat{b}) = \sum_{x,y,t} \chi_{\hat{b}}(x, y, t), \quad (8)$$

where $\chi_b(x,y,t)$ is the characteristic function as defined in Eq. (6). For each tube b, whose mapping $\hat{b}=M(b)$ is partially included in the final synopsis, we define the activity cost similar to Eq. (8) but only pixels that were not entered into the synopsis are added to the activity cost.

Collision Cost

For every two "shifted" tubes and every relative time shift between them, we define the collision cost as the volume of their space-time overlap weighted by their activity measures:

$$E_c(\hat{b}, \hat{b}') = \sum_{x,y,t \in \hat{t}_b \cap \hat{t}_{b'}} \chi_{\hat{b}}(x, y, t) \chi_{\hat{b}'}(x, y, t) \quad (9)$$

where $\hat{t}_b \cap \hat{t}_{b'}$ is the time intersection of b and b' in the synopsis video. This expression will give a low penalty to pixel whose color is similar to the background, but were added to an activity tube in the morphological dilation process. Changing the weight of the collision cost $E_c$ changes the density of objects in the synopsis video as shown in FIG. 10b.

Temporal Consistency Cost

The temporal consistency cost adds a bias towards preserving the chronological order of events. The preservation of chronological order is more important for tubes that have a strong interaction. For example—it would be preferred to keep relative time of two people talking to each other, or keep the chronological order of two events with a reasoning relation. Yet, it is very difficult to detect such interactions. Instead, the amount of interaction d(b,b') between each pair of tubes is estimated for their relative spatio-temporal distance as described below:

$$\text{if } \hat{t}_b \cap \hat{t}_{b'} \neq \emptyset \text{ then} \quad (10)$$
$$d(b, b') = \exp\left(-\min_{t \in \hat{t}_b \cap \hat{t}_{b'}} \{d(b, b', t)\} / \sigma_{space}\right),$$

where d(b,b',t) is the Euclidean distance between the pair of closest active pixels from b and b' in frame t and $\sigma_{space}$ determines the extent of the space interaction between tubes.

If tubes b and b' do not share a common time at the synopsis video, and assuming that b is mapped to earlier time than b', their interaction diminishes exponentially with time:

$$d(b,b') = \exp(-(\hat{t}_b^s, \hat{t}_{b'}^e)/\sigma_{time}), \quad (11)$$

where $\sigma_{time}$ is a parameter defining the extent of time in which events are still considered as having temporal interaction.

The temporal consistency cost creates a preference for maintaining the temporal relations between objects by penalizing cases where these relations are violated:

$$E_t(\hat{b}, \hat{b}') = d(b, b') \cdot \begin{cases} 0 & t_{b'}^s - t_b^s = \hat{t}_{b'}^s - \hat{t}_b^s \\ C & \text{otherwise,} \end{cases} \quad (12)$$

where C is a constant penalty for events that do not preserve temporal consistency.

Energy Minimization

Since the global energy function in Eqs. (7) and (15) is written as a sum of energy terms defined on single tubes or pairs of tubes, it can be minimized by various MRF-based techniques such as Belief Propagation [23] or Graph Cuts [10]. In our implementation we used the simpler simulated annealing method [9] which gave good results. The simulated annealing was applied in the space of all possible temporal mappings M, including the special case when a tube is not used at all in the synopsis video.

Each state describes the subset of tubes that are included in the synopsis, and neighboring states are defined as states in which a single activity tube is removed or changes its mapping into the synopsis. As an initial state we used the state in which all tubes are shifted to the beginning of the synopsis movie. Also, in order to accelerate computation, it is possible to restrict the temporal shifts of tubes to be in jumps of 10 frames.

Synopsis of Endless Video

As mentioned earlier, millions of webcams and surveillance cameras are covering the world, capturing their field of view 24 hours a day. One of the problems in utilizing these cameras is that they provide unedited raw data. A two hours feature film, for example, is usually created from hundreds or even thousands of hours of raw video footage. Without editing, most of the webcam data is irrelevant. Also, viewing a camera in another continent may be convenient only during hours of non-activity because of time-zone differences.

An important feature of the present invention is to make the webcam resource more useful by giving the viewer the ability to view summaries of the endless video, in addition to the live video stream provided by the camera. A user may wish to watch in five minutes a synopsis of all content captured during the previous week. To enable this, we describe a system that may be based on the object-based synopsis as described in WO2007/057893, but includes additional components that allow dealing with endless videos.

In this system, a server can view the live video feed, analyze the video for interesting events, and record an object-based description of the video. This description lists for each camera the interesting objects, their duration, location, and their appearance.

A two phase process is proposed for synopsis of endless video:
1) Online Phase during video capture. This phase is done in real time.
   Object (tube) detection and segmentation.
   Inserting detected objects into the object queue.
   Removing objects from the object queue when reaching a space limit.
2) Response Phase constructing a synopsis according to a user query. This phase may take a few minutes, depending on the amount of activity in the time period of interest. This phase includes:
   Constructing a time lapse video of the changing background. Background changes are usually caused by day-night differences, but can also be a result of an object that starts (stops) moving.
   Selecting tubes that will be included in the synopsis video and computing a visually appealing temporal arrangement of these tubes.

Stitching the tubes and the background into a coherent video. This action should take into account that activities from different times can appear simultaneously, and on a background from yet another time.

Pre-Processing—Filtering Out Stationary Frames

Many surveillance cameras and webcams image scenes that exhibit no activity over long periods. For storage efficiency, frames corresponding to such time periods are commonly filtered out during the online phase. The original time of the remaining frames is recorded together with each frame. In one implementation, frames were recorded according to two criteria: (1) A global change in the scene, measured by the sum of squared difference (SSD) between the incoming frame and the last kept frame. This criterion tracked the lighting changes expressed by a gradual illumination change in the entire frame. (2) Existence of a moving object, measured by the maximal SSD in small windows.

By assuming that moving objects with a very small duration (e.g.—less than a second) are not important, video activity can be measured only once in a few frames.

The Object Queue

One of the main challenges in handling endless videos is developing a scheme to "forget" older objects when new objects arrive. The naive scheme of discarding the oldest activity is not good, as a user may wish to get a summary of a long time duration which may include objects from the entire period. Instead, we propose an alternative scheme that aims to estimate the importance of each object to possible future queries, and discard objects accordingly.

All detected objects, represented as tubes in the space-time volume, are stored in a queue awaiting user queries. When an object is inserted into the queue, its activity cost (Eq. (8)) is computed to accelerate the future construction of synopsis videos. As the video generated by the webcam is endless, it is likely that at some point the allocated space will be exhausted, and objects will have to be removed from the queue.

When removing objects (tubes) from the queue, we prefer to remove objects that are least likely to be included in a final synopsis. In our examples we used three simple criteria that can be computed efficiently: "importance" (activity), "collision potential", and "age". But other options are possible, for example when specific appearance or activity is of interest.

A possible measure for the importance of an object is the sum of its characteristic function as defined in Eq. (8).

Since the collision cost cannot be computed before receiving the user query, an estimate for the collision cost of tubes is made using the spatial activity distribution in the scene. This spatial activity is represented by an image which is the sum of active pixels of all objects in each spatial location, normalized to sum to one. A similar spatial activity distribution is computed for each individual object (this time not normalized). The correlation between these two activity distributions is used as a "potential collision" cost for this object. FIGS. 5a and 5b show the spatial distribution of activity in the airport scene shown in FIG. 2, where intensity is log of activity value. FIG. 5a shows the activity distribution of a single tube, and FIG. 5b shows the average over all tubes. As expected, highest activity is on the car lanes and on the runway. Potential collision of tubes is higher in regions having a higher activity.

There are several possible approaches to address the removal of older objects from the queue, taking into consideration the desired distribution of objects in the synopsis. For example, the user can be interested to focus on newer events but leave some representation for old events in case they were significant. Alternatively, the synopsis should have a uniform representation of every time interval. For example, in a synopsis of 24 hours a user may be interested to see objects from each and every hour if applicable.

In the first approach we can assume that the density of objects in the queue should decrease exponentially with the age of the objects. For example, if we divide the age axis into discrete time intervals, the number of objects at the t's interval, $N_t$, be proportional to $$N_t = K \frac{1}{\sigma} e^{-\frac{t}{\sigma}}, \qquad (13)$$

where $\sigma$ is the decay coefficient, and K is determined to control the total number of objects in the queue. When an object should be removed from the queue, the number of objects in each time interval t is compared to $N_t$. Only objects from time intervals t whose population exceeds $N_t$ will be evaluated using the activity cost and the potential collision. The object with minimal activity and maximal collision will be removed.

An example of temporal distribution of objects arriving into the queue appears in FIG. 6, which shows graphically temporal distribution of activities, as measured by number of moving objects, at the airport scene of FIG. 2 over 29 hours. There are 1,920 objects during this period. Exponential decay of objects in the queue will result in an age distribution which is proportional to the arrival distribution multiplied by a decaying exponential.

Synopsis Generation

The object queue can be accessed via queries such as "I would like to have a one-minute synopsis of this camera broadcast during the past day". Given the desired period from the input video, and the desired length of the synopsis, the synopsis video is generated using four operations. (i) Generating a background video. (ii) Once the background video is defined, a consistency cost is computed for each object and for each possible time in the synopsis. (iii) An energy minimization step determines which tubes (space-time objects) appear in the synopsis and at what time. (iv) The selected tubes are combined with the background time-lapse to get the final synopsis. These operations are described in this section. The reduction of the original video to an object based representation enables a fast response to queries.

After user query a second (smaller) object queue is generated, having only objects from the desired time period. To enable fast optimization, the collision cost in Eq. (9) between every two objects in the smaller queue is computed in advance.

Time Lapse Background

The background of the synopsis video is a time lapse background video, generated before adding activity tubes into the synopsis. The background video has two tasks: (i) It should represent the background changes over time (e.g. day-night transitions, etc.). (ii) It should represent the background of the activity tubes. These two goals are conflicting, as representing the background of activity tubes will be done best when the background video covers only active periods, ignoring, for example, most night hours.

We address this trade-off by constructing two temporal distributions. (i) A temporal activity distribution $H_a$ of the video stream as shown in FIG. 6. (ii) A uniform temporal distribution $H_t$. We compute a third temporal distribution by interpolating the two temporal distributions $\lambda \cdot H_a + (1-\lambda) \cdot H_t$, where $\lambda$ is a weight given by the user. With $\lambda=0$ the background time lapse video will be uniform in time regardless of the activities, while with $\lambda=1$ the background time lapse video will include the background only from active periods. We usually use $0.25 < \lambda < 0.5$.

Background frames are selected for the time-lapse background video according to the interpolated temporal distribution. This selection is done such that the area of the histogram between every two selected background frames is equal. More frames are selected from active time durations, while not totally neglecting inactive periods.

Alternatively, the background may be replaced by a synthetic background, and objects will be placed on top of this synthetic background.

Consistency with Background

Since we do not assume accurate segmentation of moving objects, we prefer to stitch tubes to background images having a similar appearance. This tube to background consistency can be taken into account by adding a new energy term $E_b(M)$. This term will measure the cost of stitching an object to the time-lapse background. Formally, let $I_{\hat{b}}(x,y,t)$ be the color values of the mapped tube $\hat{b}$ and let $B_{out}(x,y,t)$ be the color values of the time lapse background. we set:

$$E_s(\hat{b}) = \sum_{x,y \in \sigma(\hat{b}), t \in \hat{t}_b \cap \hat{t}_{out}} \|I_{\hat{b}}(x, y, t) - B_{out}(x, y, t)\|, \quad (14)$$

where $\sigma(\hat{b})$ is the set of pixels in the border of the mapped activity tube $\hat{b}$ and $t_{out}$ is the duration of the output synopsis. This cost assumes that each tube is surrounded by pixels from its original background (resulting from our morphological dilation of the activity masks).

The background consistency term in Eq. (14) is added to the energy function described in Eq. (7), giving:

$$E(M) = \sum_{\hat{b} \in B} (E_a(\hat{b}) + \gamma E_s(\hat{b})) + \sum_{\hat{b}, \hat{b}' \in B} (\alpha E_t(\hat{b}, \hat{b}') + \beta E_c(\hat{b}, \hat{b}')), \quad (15)$$

where $\alpha, \beta, \gamma$ are user selected weights that are query dependent.

Stitching the Synopsis Video

The stitching of tubes from different time periods poses a challenge to existing methods (such as [1, 16]). Stitching all the tubes at once may result in a blending of colors from different objects, which is an undesired effect. It is better to preserve the sharp transitions between different objects, while eliminating the seams only between the objects and the background. An accurate segmentation of the objects may solve this problem, but an accurate segmentation is unrealistic. Instead, the boundaries of each tube consist of background pixels due to the morphological dilation we apply when generating the activity tubes.

The $\alpha$-Poisson Image Blending, proposed by [27] may be a good solution for the stitching between objects, but not as good as the Poisson Editing [15] for stitching the objects to the background. The suggested approach is to use the observation that all objects have a similar background (up to illumination changes), and stitch each tube independently to the time lapse background. Any blending method is possible, and we used a modification of Poisson editing: We added a regularization that preserves the original appearance of the objects even if they were stitched to background images with a different lighting conditions (e.g.—people seen during the day, stitched on top of an evening-time background).

It should also be noted that the objects pasted on to the background need not be graphically identical to the corresponding objects in the source video. For example, at least one object in the synopsis video may be formed by spatially warping the object or replacing a corresponding object in the source video by a predetermined symbol or icon. Also, when objects are added to the synopsis video, the pixel value of the objects may not necessarily replace the background value. The new value can be an average of the background and the object, creating a transparency effect.

Let $\Omega$ be an image domain with boundary $\partial \Omega$. Let $f, b$ be the foreground object (tube) and background (time lapse) pixel colors, and let s be the unknown values of the stitched object over the interior of $\Omega$. The result of the Poisson blending with regularization is given by:

$$\min_s \sum_\Omega \lfloor (\Delta s - \Delta f)^2 + \lambda(s - f)^2 \rfloor, \text{ such that } s_{\partial \Omega} = b_{\partial \Omega}, \quad (16)$$

where $\lambda$ is the weight of the regularization term. In [28] it was shown that stitching in the gradient domain can be done very efficiently.

After stitching each tube to the background, overlapping tubes are blended together by letting each pixel be a weighted average of the corresponding pixels from the stitched activity tubes $\hat{b}$, with weights proportional to the activity measures $\chi_{\hat{b}}(x,y,t)$. Alternatively, transparency can be avoided by taking the pixel with maximal activity measure instead of the weighted average.

It may be possible to use depth ordering when "object tubes" are combined, where closer tubes will occlude further tubes. A simple "ground plane" heuristic can be used, assumes that an object whose vertical image position is lower is also closer. Other depth ordering methods include [29]. The frequency of object occlusion cases depends on the relative weights of the collision cost (that prevent such cases) in respect to other costs.

Indexing

Figure 7:
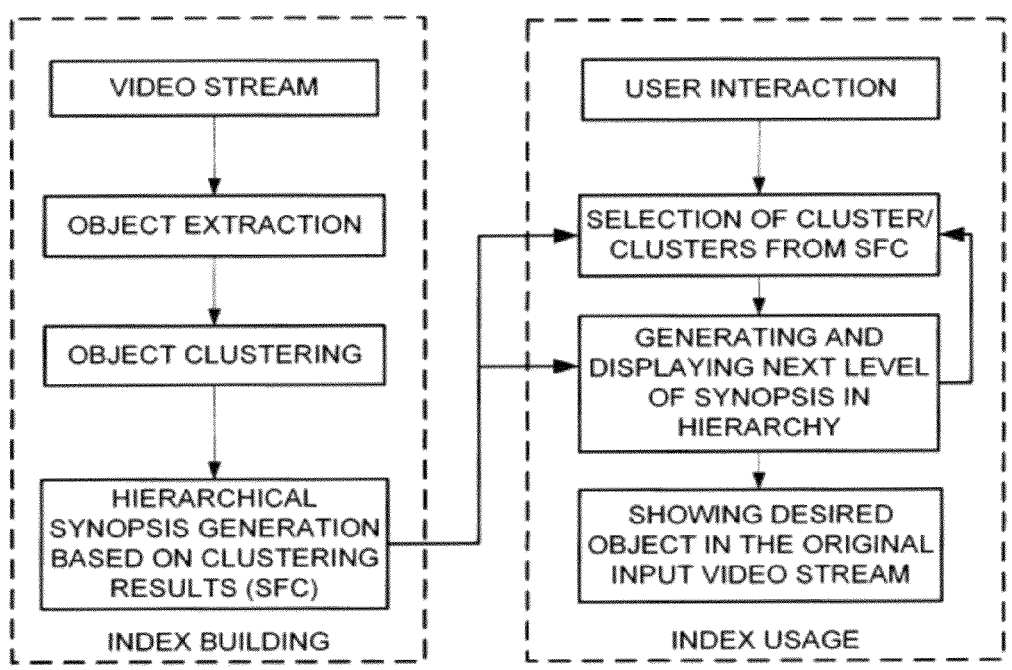
FIG. 7 is a block diagram showing architecture of synopsis-based hierarchical video indexing and search according to an embodiment of the invention.

Synopsis based hierarchical video indexing aims to provide a compact and easy method of representing and browsing video content, using visual queries, even for endless video as is the case in surveillance cameras. FIG. 7 shows a conceptual architecture of synopsis-based hierarchical video indexing and search. In this system we assume that the video into which indexing is desired has already been selected, e.g. "last hour", "last 36 hours", etc.

To build the proposed index, the video is first analyzed and active/important objects are extracted from the video to generate an object based representation of the video.

In the second stage of the indexing the objects are clustered into clusters of similar objects using any clustering method. A possible way to perform such clustering is building an affinity (similarity) matrix based on some similarity measure between every pair of objects.

Affinity (Similarity) Between Objects

An affinity measure between objects can be based on various features including, but not limited to, a correlation between the space-time representations of the objects. In order to perform efficient similarity measure, objects which are represented as 3D tubes in a space-time representation of the video, can be first warped to common coordinate system and a space time-alignment can be performed to overcome their possible different location and scale. Such warping can be useful as it results in a similarity measure that is invariant to the space-time location of the objects in the video and various projective transformations. Similar objects that have similar motion paths but in different location in the video will be considered as similar even if their original appearances are different because of perspective effects. Additional affinity measures can be the shape, size or colors of objects, and many other possible similarity measures as known in the art.

Clustering

Once the affinity matrix has been constructed, a clustering method such as [30] can be used to classify each object into its corresponding class. It is important to note that the clustering process can also be used to help identifying "irregular" objects and behavior. An object that is not clustered well to any of the classes can be suspicious as being "unique" or "irregular" and can be visualized with special marking in the process of the synopsis generation which is described later.

An example of such automatic clustering process on the objects extracted from a video sequence of 24 hours, shot in a parking lot, is illustrated in FIG. 8. In the six frames depicted therein, objects from six classes are shown: (i) people walking to the right; (ii) people walking to the left; (iii) people walking next to the building; (iv) cars moving to the right; (v) cars moving to the left; (vi) cars getting in or out of parking.

Alternatively, probabilistic clustering can be used whereby, instead of having a hard decision as to which object belongs to which class, a probability vector can be defined for each object and the different classes. This can be used in the hierarchical indexing process. For example, an object can be associated with more than one class if it fits well to those classes. It can also be used in the case where irregular activity is detected as manifested by an object that has substantially equal probabilities of belonging to different classes.

Hierarchical Index

Once the clusters are determined, and objects are grouped into clusters, a collection of hierarchical video synopsis sequences for indexing can be generated based on this clustering (Synopsis from Clusters—SFC).

A possible indexing hierarchy could first present to the user a "top-level synopsis": a synopsis video containing only a few representatives from each cluster. E.g. from the clusters shown in FIG. 8, the "top level" synopsis can represent one object from each class: one car moving to the right, one car moving to the left, one person walking to the right, one person walking to the left, etc. . . . A single frame from such synopsis can be seen in FIG. 9 where representatives of the different clusters are presented simultaneously. The user can select an entire class of objects by selecting one of the objects in the "top level" synopsis. This selection will result in presenting to the user a synopsis video showing only objects in the selected cluster.

The top-level synopsis can be used as an interactive indexing tool to get to each desired object or activity in the original video. Once a user selected a specific cluster or a collection of clusters, the next synopsis in hierarchy are displayed. Such a synopsis will contain more representatives or even all the objects from those clusters. At this stage the user can specify his desired object and get to its original time in the input video. In case there are many objects in each class, and it is hard to generate a short synopsis, it is possible to add more levels to the hierarchy and generate several sub clusters from each original cluster. For example, selecting the "cars moving to the right" cluster may generate two sub clusters of trucks and of sedans. In this case selecting one of the sub clusters will be needed before getting to the final result of the search, showing a synopsis with most of the original objects.

Such an approach provides a very quick search and indexing tool into a very large video which is based on visual queries and enables every object and activity in the original video to be reached in a reasonable time.

Examples

We tested video synopsis on a few video streams captured off the Internet. As the frame rate is not constant over the Internet, and frames drop periodically, whenever we use a temporal neighborhood we do not count the number of frames, but we use the absolute times of each frame.

FIGS. 10 and 12 are from cameras stationed outdoors, while FIG. 11 is from a camera stationed indoors with constant lighting. In most examples the main "interest" of each tube has been the number of moving pixels in it.

FIGS. 10a and 10b show the effect of the choice of collision cost of the density of objects in the video synopsis. FIG. 10a shows a frame from a 20 second synopsis of a video captured over 24 hours at Stuttgart airport. FIG. 10b shows that reducing the "collision penalty" in the cost function substantially increases the object density, thereby allowing more overlap between objects. FIG. 12 shows shape based preferences. In FIG. 12a the regular cost function was used, and the large objects (moving cars) were preferred. In FIG. 12b small, dark, objects were preferred, showing a completely different pedestrian activity. FIG. 11 shows a frame from a short synopsis of a video captured over 9 hours in a Billiard club. Notice the multiple players per table at the synopsis.

Customized Energy Functions

In most cases not all objects are of interest. A traffic surveillance camera may be interested only in cars, while other applications may prefer pedestrians. Filtering of objects can be done in several places. Objects can be filtered out before entering to the queue, and in this case it will never be possible to retrieve them. Alternatively, objects can be filtered only at the query stage. In this case the queue will include all objects, and different queries can extract different objects from the queue. It is also possible to create a customized energy function for each application.

A simple example of customization is shown in FIG. 12b, where only small, dark, objects were selected from the queue. While the original synopsis includes mostly cars, the new synopsis includes mostly pedestrians. Another example appears in FIG. 13, where the energy function included the element of a "phase transition", when a moving object stops and becomes part of the background. FIG. 13a shows a frame from a short synopsis taken over five hours from a webcam watching a quiet parking lot. A high score was given to phase transitions (e.g. moving objects that stop and become background). The video synopsis includes mostly cars involved in parking. FIG. 13b shows an altenative synopsis where objects without phase transitions are preferred, so that only passing cars and pedestrians are shown.

Synopsis Specification

There are a few schemes for specifying the duration and quality of the video synopsis.

(a) Let the user specify the desired duration of the video synopsis and the penalty for object collision. In this case, the optimization stage will maximize the amount of activity that can be included in the synopsis under the specified constraints.

(b) Let the user specify the desired duration of the video synopsis and the percentage of activity to be included in it. The optimization stage will generate a video synopsis having minimum collisions under the specified constraints.

(c) Let the user specify the allowed percentage of lost objects and the penalty for object collision. The optimization stage will minimize the duration of the synopsis under the specified constraints.

In our experiments we have implemented option (a), where the duration of the video synopsis was determined by the user as a hard constraint. Surveillance video may prefer options (b) or (c), assuring that most objects will be represented in the synopsis.

Object Based Speed Changes

Fast-forward is the most common tool used for video summarization, and has always been applied to entire frames. For example, "time lapse" videos display in a short time slow processes like the growth of flowers, etc. Some current methods suggest an adaptive fast-forward [12, 18, 4] but are still limited to the framework of entire frames. With video synopsis each object can have its own "fast forward" based on its importance, or based on its original velocity. Slow objects may be accelerated, but not fast objects. Alternatively, fast objects may be slowed down for easier viewing.

Object speed changes can be done in a simple manner, e.g. bringing all moving objects to a uniform velocity. For this purpose slow objects will be speeded up, and fast objects will be slowed down. Alternatively, the change of speed of objects can be determined during the optimization stage, giving some penalty to speed changes of objects. Adding object-based speed changes to the optimization stage can further improve the temporal compression rate of the synopsis video, at the expense of increasing the complexity of the optimization.

Speed changes of an object can be performed by sampling pixels from an object at some selected time periods. If the number of selected time periods is smaller than the number of frames in the tube, the general effect is that the objected is speeded up. If the number of selected time periods is larger than the number of frames in the tube, the object is slowed down. When a selected time period does not fall exactly on a frame, the pixel at this time can be interpolated from neighboring pixels at neighboring frames closest in time to the selected time. Any possible interpolation method may be used.

Foreground-Background Phase Transitions

Phase transitions occur when a moving object becomes stationary and merges with the background, or when a stationary object starts moving. Examples are cars being parked or getting out of parking. In most cases phase transitions are significant events, and we detect and mark each phase transition for use in the query stage.

We can find phase transitions by looking for background changes that correspond to beginning and ending of tubes. These transitions are important as they explain the changes in the background. Since phase transitions correspond to changes in the background, the stitching of phase transitions into the background should be given special attention. Two effects may occur in the synopsis video when phase transitions are not inserted into the background at the right time. (i) Background objects will appear and disappear with no reason, causing a flickering effect. (ii) Moving objects will disappear when they stop moving, rather than become part of the background. To minimize such effects in the video synopsis, phase transitions should be inserted into the time lapse background at a time that corresponds to their original time.

System Hardware

Figure 14:
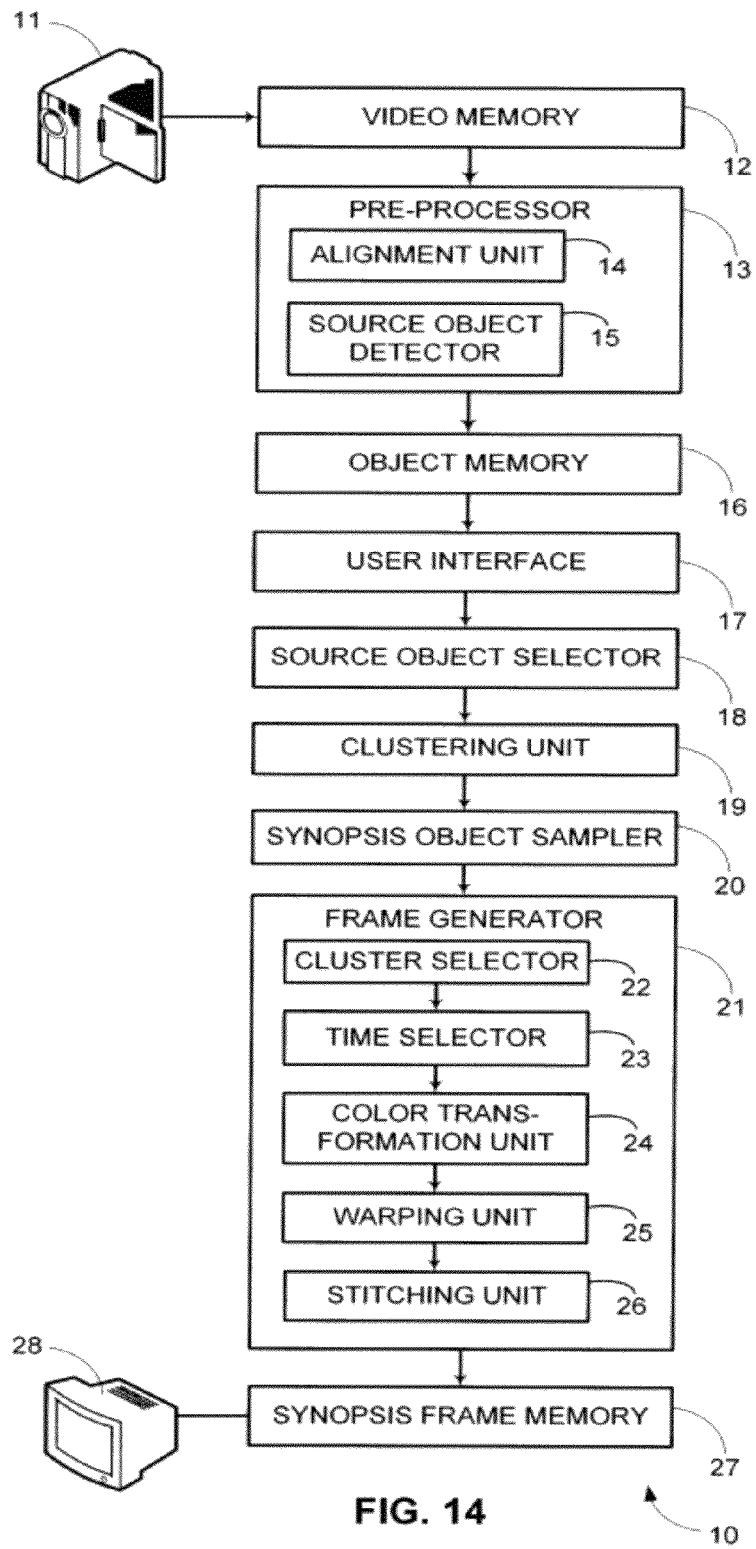
FIG. 14 is a block diagram showing the main functionality of a system according to the invention.

Referring now to FIG. 14, there is shown a block diagram of a system 10 according to the invention for generating a synopsis video from a source video captured by a camera 11. The system 10 includes a video memory 12 for storing a subset of video frames of the first source video that show movement of at least one object comprising a plurality of pixels located at respective x, y coordinates. A pre-processor 13 processes the captured video on line. The pre-processor 13 may include an alignment unit 14 for pre-aligning the video frames. In this case, the camera 11 will be coupled to the alignment unit 14 so as to store the pre-aligned video frames in the video memory 12. The alignment unit 14 may operate by:

computing image motion parameters between frames in the source video;

warping the video frames in the source video so that stationary objects in the imaged scene will be stationary in the video.

The pre-processor 13 also includes a source object detector 15 that detect objects in the source video and queues the detected objects in an object memory 16. As noted above, when an object is inserted into the queue, its activity cost (Eq. (8)) is computed to accelerate the future construction of synopsis videos, this also being done by the pre-processor 13. It is to be understood that the pre-processor 13 is shown for the sake of completeness owing to its use when creating a synopsis video from an endless source video. The invention also contemplates a reduced system without the pre-processor 13 that is adapted to be coupled to the object memory 16 for manipulating the object queue so as to create a synopsis video according to defined criteria. Such a system is realized by the remaining components in FIG. 14, as will now be described.

Thus, a user interface 17 is coupled to the object memory 16 for allowing user-defined constraints to be defined. Such constraints may be used, for example, to define a time window within the source video to be summarized. It may also be used to define the required duration of the synopsis video. The user interface 17 is also used to select objects or object classes for indexing purposes. It will be appreciated that the constraints may also be predefined, in which case some embodiments of the invention will not require the user interface 17.

A source object selector 18 is coupled to the object memory 16 for selecting from the subset at least three different source objects according to the user-defined constraints or to default constraints defined by the system. Each of the different source objects is a connected subset of image points from at least three different frames of the source video. A clustering unit 19 may optionally be coupled to the source object selector 18 for clustering objects according to defined criteria, which may be specified by the user using the user interface 17. A synopsis object sampler 20 is coupled to the source object selector 18 or to the clustering unit 19 when provided, for sampling from each selected source object one or more synopsis objects by temporal selection using image points derived from some selected frames. The "sampler" may be used to change the speed of individual objects. A frame generator 21 includes a cluster selector 22 that allows only selected clusters to be included in the synopsis video. The frame generator 21 also includes a time selector 23 for selecting for each synopsis object a respective time for starting its display in the synopsis video. The frame generator 21 further includes a color transformation unit 24 for selecting for each synopsis object and each frame a respective color transformation for displaying the synopsis object. Optionally, the frame generator 21 may include a warping unit 25 for spatially warping objects prior to stitching to the synopsis video. Within the context of the description and the appended claims, the term "warping" is intended to embrace any spatial editing of an object. As noted above, this can include replacing an object in its entirety by another object such as an icon; or it can simply involve effecting slight geometric adjustments to an object prior to its being stitched in the synopsis video. A stitching unit 26 within the frame generator 21 stitches the selected color-transformed synopsis objects so as to generate successive synopsis video frames. The frames of the synopsis video are stored in a synopsis frame memory 27 for subsequent processing or display by a display unit 28 that displays the temporally shifted objects at their specified time and color transformation.

The system 10 may in practice be realized by a suitably programmed computer having a graphics card or workstation and suitable peripherals, all as are well known in the art.

Figure 15:
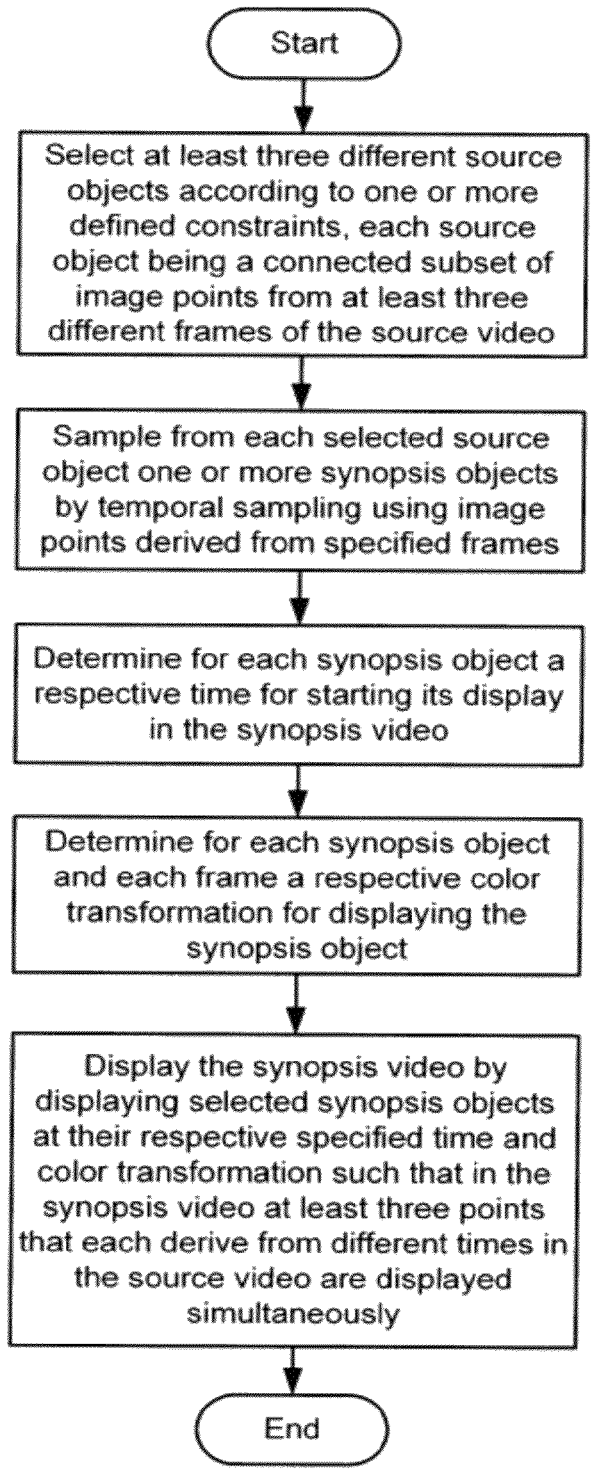
FIG. 15 is a flow diagram showing the principal operation carried in accordance with the invention.

FIG. 15 is a flow diagram showing the principal operation carried by the system 10 in accordance with an embodiment of the invention.

Concluding Remarks

Object-based synopsis can be used to create a short video that is a synopsis of an endless video streams, such as recorded by surveillance cameras. The method includes two phases. In the input phase, which is performed in real time, the video stream is analyzed and objects of interest are detected and segmented from their background. While an object interest function based on motion has been described, any other approach for object detection, recognition, and segmentation can be used for the generation of the "tubes"—the 3D space-time representation of each object.

Queue management is necessary to bridge the gap between infinite video and finite storage, and to enable fast response to user queries. Several methodologies have been described for determining which objects should be removed from the queue once it becomes full, but other methodologies are possible. Even a random selection of objects for removal from the queue may work fine.

The second phase occurs after the user's query is given. A subset of the queue is extracted based on the period of interest, and the object tubes are arranged (by temporal shifts) to generate the optimal video synopsis. This stage, which requires off-line computation, delivers the video synopsis to the user.

Some very interesting aspects concern periodicity in background. Day-night periods are particularly amenable to detection. In most cases when a few days are covered by a single synopsis, the time-lapse background may cover only a single day, while the activities will come from all days. This should be an option given to the user specifying the query.

It will be understood that reference to "image points" unless specifically limited to binary segmentation, is intended to embrace also image points as determined by interpolation or by non-binary segmentation methods such as fuzzy segmentation.

It is also to be understood that when a source video is monochrome, the color transformation unit may be used to determine an appropriate gray scale transformation to be applied to selected synopsis objects prior to stitching. Therefore, within the context of the appended claims, the term "color" is not intended to be limited only to RGB but may also be monochrome.

It should also be noted that transformation of color or grayscale is only one type of transformation that may be applied to selected synopsis object prior to stitching. As explained above, this is particularly beneficial when generating a synopsis video from a source video that spans a long duration in order to ensure background consistency. But it may be less critical when a synopsis video is derived from a source video in which the background hue is sufficiently constant during the required time window.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method for generating a synopsis video from a substantially endless source video stream as generated by a video surveillance camera, the method comprising:
   receiving in real time object-based descriptions of at least three different source objects in said source video stream, each source object being a connected subset of image points from at least three different frames of the source video stream;
   continuously maintaining a queue of said received object-based descriptions including for each respective source object its duration and location;
   selecting a subset of at least three source objects from said queue based on given criteria, and sampling from each selected source object one or more synopsis objects by temporal sampling;
   determining for each synopsis object a respective display time for starting its display in the synopsis video; and
   generating the synopsis video by displaying selected synopsis objects or objects derived therefrom each at its respective predetermined display time;
   such that at least three points, each derived from different respective times in the source video stream, are displayed simultaneously in the synopsis video and at least two points, both derived from the same time, are displayed at different times in the synopsis video.

2. The method according to claim 1, further including:
   determining for each synopsis object and each frame in the synopsis video a respective color transformation for displaying the synopsis object; and
   displaying said selected synopsis objects or the objects derived therefrom at their respective color transformation.

3. The method according to claim 1, wherein one of the objects is a background object.

4. The method according to claim 3, including stitching the objects and the background into a seamless video.

5. The method according to claim 1, wherein source objects are selected from the queue and a respective time for starting the display of each synopsis object is determined so as to optimize a cost function.

6. The method according to claim 1, wherein the background object is generated synthetically.

7. The method according to claim 1, wherein each object in the synopsis video points to a time segment in the source video stream where the respective object is visible.

8. The method according to claim 7, wherein selecting an object causes the time segment in the source video stream pointed to by the selected object to be played.

9. The method according to claim 1, wherein at least one object in the synopsis video is formed by replacing a corresponding object in the source video stream by a predetermined symbol.

10. The method according to claim 1, wherein objects are first clustered into similar classes, and the synopsis video includes objects from at least a pre-determined number of classes.

11. The method according to claim 1, wherein objects are first clustered into similar classes, and objects from at least one selected class are not displayed.

12. The method according to claim 7, wherein objects are first clustered into similar classes and selecting an object points to a video synopsis including objects only from the same class as the selected object.

13. The method according to claim 1, wherein selecting one or more source objects includes:
computing a cost function for stitching the synopsis objects onto the synopsis video; and
selecting synopsis objects for which the cost function is considered as close to optimal as can be achieved.

14. The method according to claim 1, wherein selecting at least three non-overlapping source objects from the queue includes filtering the source objects based on user-defined constraints and limiting filtered source objects to source objects that appear within a specified time window.

15. The method according to claim 1, wherein selecting at least three non-overlapping source objects includes determining an interest score.

16. The method according to claim 15, wherein the interest score is a measure of activity.

17. The method according to claim 1, wherein the synopsis video contains all objects of interest in the source video stream.

18. The method according to claim 1, wherein a number of objects of interest in the source video stream that appear also in the synopsis video is a tradeoff between maximizing said number while maintaining visual appeal of the synopsis video.

19. The method according to claim 1, wherein the source video stream is captured by a single camera.

20. The method according to claim 19, including maintaining said single camera at a fixed location.

21. The method according to claim 20, wherein the camera is rotated relative to an axis at said fixed location.

22. The method according to claim 1, including spatially warping at least one of said synopsis objects prior to display thereof.

23. The method according to claim 1, including pre-aligning the source video stream so as to produce a stabilized source video stream by:
(a) computing image motion parameters between frames in the source video stream;
(b) warping the video frames in the source video stream so that stationary objects will appear stationary in the stabilized source video stream.

24. The method according to claim 1, being used for video surveillance.

25. The method according to claim 1, being used for at least one in the group of: video indexing, video browsing and video retrieval.

26. The method according to claim 25, including maintaining for pixels in the synopsis video a pointer to corresponding pixels in the source video stream.

27. A system for generating a synopsis video from a substantially endless a source video stream as generated by a surveillance camera, the system comprising:
a source object selector adapted to be coupled to an object memory that stores a continuously maintained queue of object-based descriptions of at least three different source objects in said source video stream, said object-based descriptions including for each respective source object its duration and location, the source object selector being adapted to select at least three different source objects according to one or more defined constraints, each source object being a connected subset of image points from at least three different frames of the source video stream;
a synopsis object sampler coupled to the source object selector for sampling from each selected source object one or more synopsis objects by temporal sampling using image points derived from specified time periods;
a time selection unit coupled to the synopsis object sampler for determining for each synopsis object a respective display time for starting its display in the synopsis video;
a stitching unit coupled to the time selection unit for stitching each of the selected synopsis objects or objects derived therefrom at a respective display time so as to generate successive synopsis video frames, such that in the synopsis video frames at least three points that each derive from different respective times in the source video stream are displayed simultaneously; and
a synopsis frame memory coupled to the stitching unit for storing said synopsis video frames.

28. The system according to claim 27, further including a display unit coupled to the stitching unit for displaying the synopsis video.

29. The system according to claim 27, further including a color transformation unit coupled to the time selection unit for determining for each synopsis object and each frame a respective color transformation for displaying the synopsis object; the stitching unit being coupled to the color transformation unit for stitching the selected synopsis objects or objects derived therefrom at their respective color transformation.

30. The system according to claim 27, further including a user interface coupled to the object memory for allowing user-defined constraints to be defined.

31. The system according to claim 27, further including a clustering unit for clustering objects according to defined criteria.

32. The system according to claim 27, further including a pre-processor for processing captured video on line to detect said objects in the source video stream, said pre-processor being adapted for coupling to the object memory for storing said objects therein.

33. The system according to claim 32, wherein the pre-processor includes an alignment unit for pre-aligning video frames in the source video stream.

34. The system according to claim 33, wherein the alignment unit is adapted to:
compute image motion parameters between frames in the first sequence; and
warp the video frames in the first sequence so that stationary objects in the first dynamic scene will be stationary in the video.

35. The system according to claim 27, wherein the frame generator includes a warping unit for spatially warping at least one object prior to stitching to the synopsis video.

36. The system according to claim 27, being adapted for at least one in the group of:
video indexing, video browsing and video retrieval.

37. A computer program product for generating a synopsis video from a substantially endless a source video stream as generated by a surveillance camera, the computer program product comprising:
a non-transitory readable computer medium having computer readable program embodied therewith, the computer readable program comprising:
computer readable program configured to store continuously maintained queue of object-based descriptions of at least three different source objects in said source video stream, said object-based descriptions including for each respective source object its duration and location, the source object selector being adapted to select at least three different source objects according to one or more defined constraints, each source object being a connected subset of image points from at least three different frames of the source video stream;
computer readable program configured to sample from each selected source object one or more synopsis objects by temporal sampling using image points derived from specified time periods;
computer readable program configured to determine for each synopsis object a respective display time for starting its display in the synopsis video;
computer readable program configured to stitch each of the selected synopsis objects or objects derived therefrom at a respective display time so as to generate successive synopsis video frames, such that in the synopsis video frames at least three points that each derive from different respective times in the source video stream are displayed simultaneously; and
computer readable program configured to store said synopsis video frames.

* * * * *